United States Patent
Moore et al.

(10) Patent No.: US 6,845,318 B1
(45) Date of Patent: Jan. 18, 2005

(54) METHODS, DATA STRUCTURES, AND SYSTEMS FOR PROCESSING TRACK LOGS

(75) Inventors: Ryan T. Moore, Overland Park, KS (US); Scott T. Moore, Olathe, KS (US); John H. Conrad, Lee's Summit, MO (US)

(73) Assignee: Garmin Ltd. (KY)

( * ) Notice: Subject to any disclaimer, the term of this patent is extended or adjusted under 35 U.S.C. 154(b) by 0 days.

(21) Appl. No.: 10/409,856

(22) Filed: Apr. 9, 2003

(51) Int. Cl.[7] .................... G01C 21/26; G01C 21/28; G01C 21/30; G01C 21/32; G01C 21/36

(52) U.S. Cl. .................. 701/200; 701/21; 701/208; 701/201; 701/202; 701/205; 701/207; 701/213; 340/990; 340/995.26; 392/357.13

(58) Field of Search ................................ 701/200, 201, 701/202, 205, 207, 213; 340/990, 995.26; 342/357.13

(56) References Cited

U.S. PATENT DOCUMENTS

| | | | |
|---|---|---|---|
| 5,543,802 A | 8/1996 | Villevieille et al. | 342/357 |
| 6,278,938 B1 * | 8/2001 | Alumbaugh | 701/208 |
| 6,459,987 B1 | 10/2002 | Krull et al. | 701/213 |
| 2002/0169527 A1 * | 11/2002 | Cline | 701/21 |

* cited by examiner

Primary Examiner—Marthe Y. Marc-Coleman
(74) Attorney, Agent, or Firm—Devon A. Rolf (57) ABSTRACT

Methods, data structures, and systems provide techniques for processing track logs. A track log is represented as a plurality of track points. The track points represent geographic positions previously traversed. The track log and the track points are overlaid on a map and presented on a display in communication with a portable navigation device. Track points are graphically selected and identified via the display. Any graphically selected track point is also associated with a selectable operation for immediate, automatic, and/or subsequent execution on the portable navigation device.

22 Claims, 4 Drawing Sheets

METHODS, DATA STRUCTURES, AND SYSTEMS FOR PROCESSING TRACK LOGS

FIELD OF THE INVENTION

The present invention relates generally to methods, data structures, and systems for graphically selecting and performing operations on track logs accessible to navigation devices.

BACKGROUND OF THE INVENTION

Track logs are used in a navigation device to provide an indication of where the device has been. One description of a track log is a series of geographical points (e.g., longitudinal and latitudinal points) assembled to represent previously traversed routes of the device. Track logs can be visualized as a trail of electronic bread crumbs, where each bread crumb is a track point (e.g., longitudinal and latitudinal coordinate) that identifies the position of the device, the calendar date that the device was at the position, and the time of day that the device was at the position.

One type of navigation device in which track logs have been used is a device with Global Positioning System (GPS) capabilities. For a device with GPS capabilities, one description of a track log is one in which tracked geographical points for the device are recorded after the unit initially obtains a satellite signal, or is instructed to record.

An active track log is one that is currently being recorded by the device. It is known to extract an end portion of an active track log by presenting a user with a menu that shows recent times at different points within the track logs, and then saving the range of track points between the time the user selects and the most recently recorded track point in the active track log. Known track points include position information (such as latitude and longitude information), a timestamp (calendar date and time of day), and elevation.

Conventional track log extraction techniques provide a user with only a limited number of track points that may be subsequently selected by the user or presented to the user via a display of the navigation device. Moreover, selection is achieved via a table presented on the display having the timestamp, where only a limited number of track points are available for selection. Furthermore, once a track point is selected by a user, few if any useful operations can be performed on the selected track point. As a result, track log features are limited and not fully utilized by users, because the selection technique is cumbersome and the ability to process operations too restrictive.

Therefore, there exists a need for techniques that permit all track points to be available for selection. Moreover, any selected track point should be selectable via user-friendly interfaces. Additionally, track point selection should permit the processing and assignment of operations, which are generally desired by the user.

SUMMARY OF THE INVENTION

The above-mentioned limitations, associated with processing track logs for navigation devices, are addressed by various embodiments of the present invention and will be understood by reading and studying the following specification. Methods, data structures, and systems are provided for the improved processing of track logs. Generally, and in broad terms, a track log is represented as a plurality of track points. The track log is overlaid on a map and presented on a display that is accessible to a navigation device. Furthermore, a selective track point is graphically manipulated from a presentation on the display and assigned to an operation.

More specifically, and in one embodiment of the present invention, a method of processing a track log in a portable navigation device is presented. A track log is represented as a plurality of track points overlaid graphically on a map. A graphical selection for one of the track points is received. Furthermore, an operation associated with the selection is processed.

In still another embodiment of the present invention a track log data structure residing on a computer readable medium for processing track points is provided. The track log data structure includes a plurality of track points represented as geographic positions previously traversed by a portable navigation device. The track points are graphically presented on a display in communication with a portable navigation device as the track log. Moreover, a track point is graphically selected using a selection device of the navigation device and one or more operations are associated with the selected track point for immediate or subsequent processing by the portable navigation device.

In yet another embodiment of the present invention, a track log processing system is taught. The track log processing system includes a portable navigation device, a display, and a track processing application. The display is in communication with the portable navigation device. The track point processing application is operable to execute in the portable navigation device and identify a plurality of track points associated with a track log data structure. Further, the track point processing application permits graphic selection, from the display, of a track point. Also, the selected track point is selectively associated with an operation, which is operable to be executed on the portable navigation device.

These and other embodiments, aspects, advantages, and features of the present invention will be set forth in part in the description which follows, and in part will become apparent to one of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE INVENTION

In the following detailed description of the invention, reference is made to the accompanying drawings that form a part hereof, and in which is shown, by way of illustration, specific embodiments in which the invention can be practiced. The embodiments are intended to describe aspects of the invention in sufficient detail to enable one of ordinary skill in the art to practice the invention. Other embodiments can be utilized and changes can be made without departing from the scope of the present invention. The following detailed description is, therefore, not to be taken in a limiting sense, and the scope of the present invention is defined only by the appended claims, along with the full scope of equivalents to which such claims are entitled.

As used herein a portable navigation device is any portable positioning device capable of resolving its current geographical position. In some embodiments, a portable navigation device is a portable electronic device (e.g., a personal digital assistant (PDA), and others), a cellular phone, an intelligent appliance having processor and memory capabilities, an intelligent apparel device (e.g. goggles, helmet, and others) having processor and memory capabilities, or a portable computing device (e.g., a laptop computer, and others). The geographic positions can be anywhere within the earth, including land, water, and air where positions can be detected.

In one embodiment, the portable navigation device is a GPS-enabled device, such as a Geko device distributed by Garmin, Ltd. of the Cayman, Islands. However, one of ordinary skill in the art readily appreciates that any navigation/positioning device and/or combination communication device capable of interfacing with a positioning system can be readily modified in order to implement the teachings of various embodiments of the present invention. Thus, all such devices having such modifications are intended to fall within the broad scope of the present invention.

Furthermore, positioning systems can include GPS systems or any communication system capable of providing multiple positions for transmission towers relative to a positioning device, such that the positioning device can execute a triangulation algorithm (or other algorithms) in order to resolve its current geographic position. Thus, positioning systems can include cellular, Infrared (IR), Radio Frequency (RF), and other transmission types that are position enabled.

Figure 1:
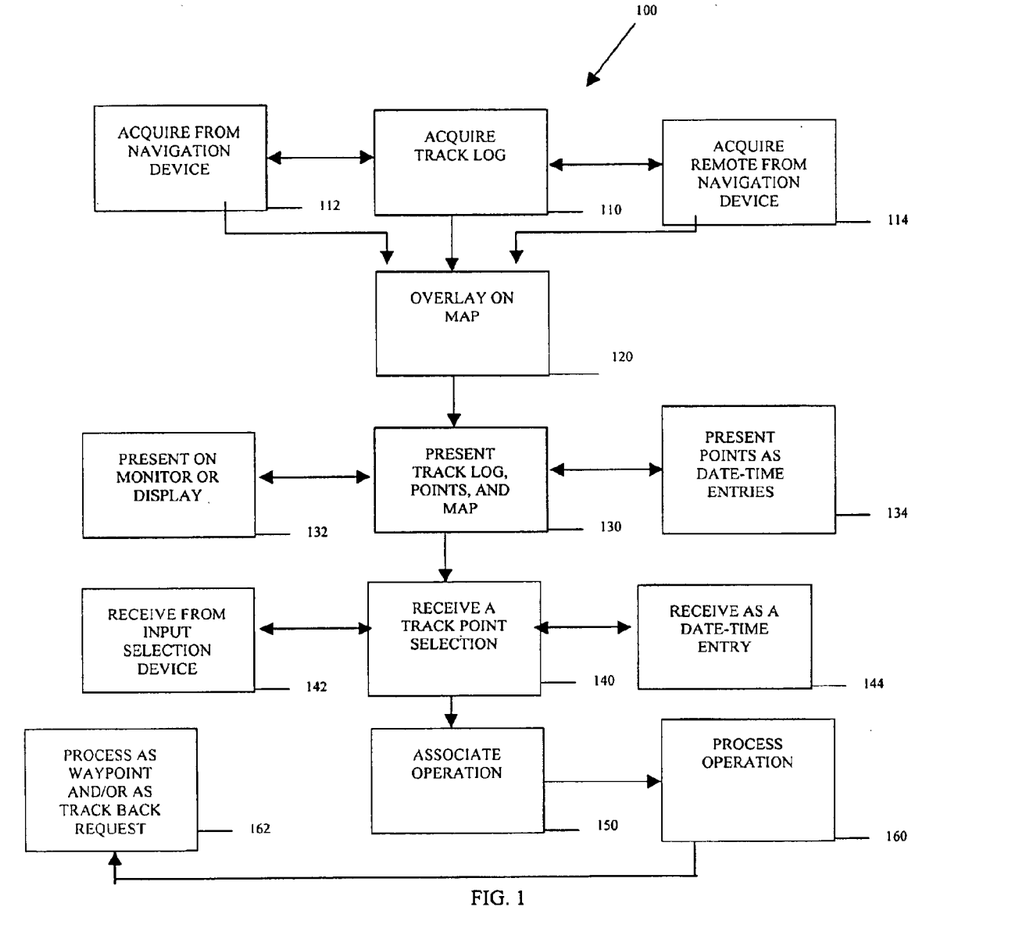
FIG. 1 is a flowchart of a method for processing a track log, according to the teachings of the present invention.

FIG. 1 illustrates a flowchart of one method 100 for processing a track log, according to the teachings of the present invention. The method 100 can be implemented within a portable navigation device or any processing device that is position-enabled. Moreover, the method 100 is implemented as one or more software applications processing on a portable navigation or position-enabled processing device.

At 110 a track log data structure or electronic file is acquired. In some embodiments, at 112, the track log is acquired from memory or storage that is directly associated with or connected to the portable navigation or processing device that is processing method 100. In other embodiments, at 114, the track log data structure or electronic file is acquired remotely from the portable navigation or processing device that is processing method 100. Moreover, the track log data structure can be stored on removable computer readable media that is interfaced to the portable navigation or processing device that is processing method 100.

The track log includes a plurality of track points. Each track point includes a variety of meta data used to uniquely identify each track point and provide attribute information that is useful to a user accessing a track point. Thus, each track point includes a geographical position identified by a coordinate having an elevation, a longitudinal position, and a latitudinal position. This geographical position allows each track point to be uniquely identified.

Other attribute information, such as a calendar date and a time of day timestamp permit each track point to receive a sequencing order within the track log and/or descriptive labeling information. Thus, a timestamp can be used to assemble track points in a required sequencing order so that a track log can be assembled. Alternatively, a timestamp can be used to simply provide a more useful/descriptive label to an end user, since as one of ordinary skill in the art appreciates any pointer data structure can be used to assemble a list of track points in order to form the track log and a time stamp is not required. Additionally, a simple table data structure can be used to assemble a track log where each sequential cell of the table is a track point within a track log. Primarily, the timestamp provides a descriptive label to an end user accessing a track point.

Conventionally, a track log included only a very limited number of selectable track points, such as 8 or fewer, and any track back operation destination was limited to these track points. Thus, any attempted selection by a user of a particular location along a track log, the location was estimated to be a location that was nearest to one of the 8 or fewer available track points. However, with various embodiments of the present invention, a track log can include an order of magnitude of additional graphical selectable track points (10,000 or more) significantly beyond what has been conventionally available. Correspondingly, track logs provide more useful (e.g., graphical selection) and selectable track point coordinates than what has been conventionally available.

The track log is overlaid on a map data structure. The map can be represented with cartographic data having enough information to permit presentation of routes, landmarks, streets, and other information. The track log is overlaid or superimposed within the map at 120. At 130, the track log, the track points comprising the track log and the map are presented to an end user.

In some embodiments, at 132, the presentation of the track log, the track points, and the map are made graphically within a display or monitor that is in communication with or accessible to a navigation or processing device that is executing method 100. The display or monitor can be in communication with the portable navigation or processing device via a hardwired connection, an internal bus connection, or a wireless connection.

As a user accesses an input selection device (e.g., a mouse, a wand, an arrow key, or other selection key or control), a graphical selection focus within the display or monitor is visually depicted (e.g., as a moving arrow, symbol, icon, or other image). The input selection device is interfaced to the portable navigation or processing device that is executing method 100. As focus changes, presentation within the display or monitor is dynamically updated.

Moreover, when the focus is over the track log, any track point associated with the current focus is visually overlaid or presented within the display as date and time entries (e.g., a calendar date and time of day timestamps) at 134. This timestamp represents when the portable navigation or processing device traversed or was at the particular track point that is in focus. However, in instances where a track log is acquired from remote or removable computer accessible media, the timestamp need not indicate when the processing portable navigation device traversed a track point, but rather when some portable navigation device traversed that particular track point. This is so, because in some embodiments of the present invention track logs are portable between navigation devices and/or can be stored remote from navigation devices.

At 140, when a user is accessing the input selection device and acquires a focus over a desired track point for the track log, the desired track point can be graphically selected by the user. Selection can occur by accessing a key, button, and the like associated with the input selection device, as depicted at 142 or selection can be achieved just by having a desired focus. In other embodiments, graphical selection can be directly made by entering a date and time entry into a field or table associated with a presentation of the display or monitor, as depicted at 144.

When a graphical user selection of a track point is identified, the user can also access a number of other pull down menus, function keys, or buttons associated with the portable navigation or processing device, at 150, that associates one or more operations with the selected track point. In some embodiments, this association of one or more operations to a graphically selected track point can cause immediate and automatic processing of the associated operation at 160. In other embodiments, the processing of the associated operation can occur when a predefined or user defined event is raised or detected.

In one embodiment, at 162, the processing of the associated operation results in a waypoint being created for the selected track point. A waypoint is a user-defined coordinate that can include user defined labels, visual attributes, and other informational attributes meaningful to the user. In other embodiments, at 162, the processing of the associated operation results in a route being automatically generated within the map from the portable navigation device's current geographical position to the selected track point (e.g., track back operation). A variety of other operations may also be useful to a user and can be configured by the end user to be immediately or subsequently processed at 160 with a selected track point.

With embodiments of the present invention, users can scroll through a track log that is graphically displayed within a map on a display of a portable navigation device. As the user scrolls using a selection input device, timestamps for track logs that comprise the track points are visually displayed to the user. Moreover, the track logs with various embodiments of the present invention are more granular since the number of graphically selectable track points is orders of magnitude greater than conventional track logs.

Users can graphically select granular track points along the track log and assign or automatically process operations associated with any selected track point. Conventionally, only a track back operation was available to the user, and the track back operation destination was associated with only a limited number of track points. Thus, users can now experience an interface that is more intuitive to use when selecting track points along a track log, the selections are more granular (more selectable track points), and a variety of operations can be selectively assigned to and/or automatically processed on any selected track points.

Figure 2:
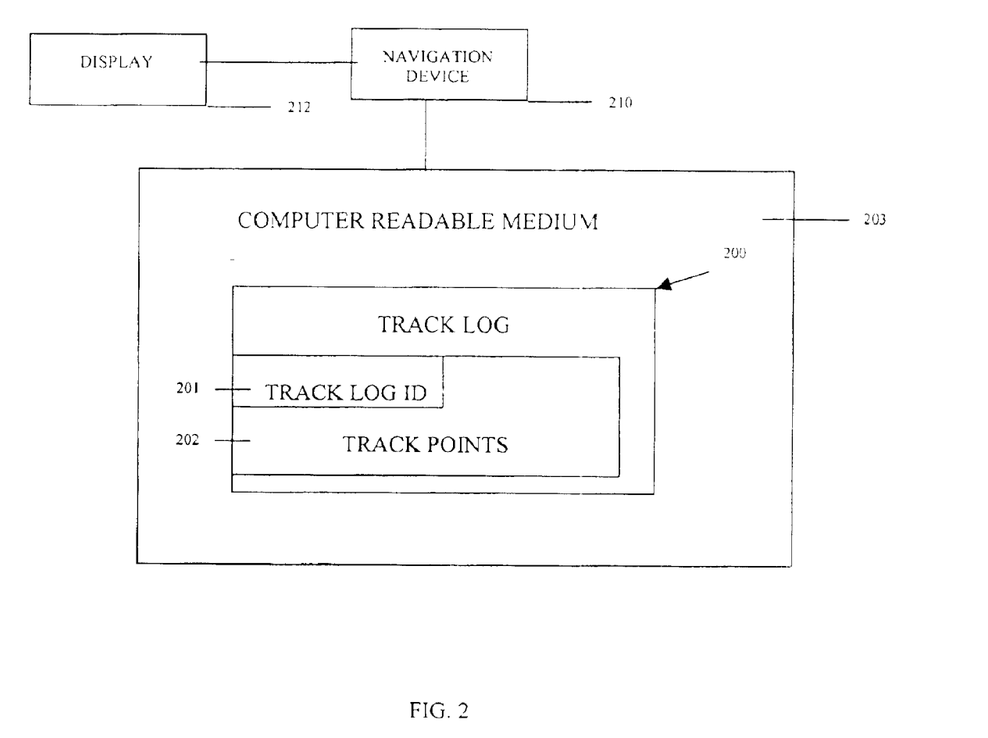
FIG. 2 is a diagram of a track log data structure used for processing track points, according to the teachings of the present invention.

FIG. 2 illustrates a diagram of one track log data structure 200 used for processing track points, according to the teachings of the present invention. The track log data structure 200 includes, optionally, a track log identifier 201 and a plurality of track points 202. The track log data structure 200 resides in a computer readable or accessible medium 203. Alternatively, the track log data structure 200 resides in a plurality of computer readable or accessible media and is logically assembled when needed as track log data structure 200.

In some embodiments, the track log identifier 201 is not needed, such as when only a single track log data structure 200 is being used or when the track log data structure 200 is automatically and dynamically derived based on a selectable time period. Thus, a track log data structure 200 can be dynamically generated and assembled from track points 202 within given and defined time periods.

In other embodiments, a track log identifier 201 may be useful such as when a variety of user-defined track log data structures 200 remotely reside from a processing portable navigation device 210, and the track points 202 of the track log data structure 200 are not unique within the portable navigation device. In these circumstances and perhaps others, a track log identifier 201 may be useful in uniquely identifying, acquiring, and loading a specific track log data structure 200 into a portable navigation device 210 for processing in accordance with various embodiments of the present invention.

Once a track log data structure 200 is acquired and loaded for processing in a portable navigation device 210, the track log, the track points 202 comprising the track log data structure 200, and a cartographic map data structure are presented within a display 212 that is in communication with the portable navigation device 210. The track log data structure 200 is overlaid on top of or super imposed onto the map data structure within the display 212.

The track points 202 include or are associated with a number of other data structures that represent a geographic position for each track point and a timestamp when each track point was visited by the processing portable navigation device 210 or by some other initially recording processing device that originally produced the track log data structure 200.

The portable navigation device 210 also includes an input selection device that permits a user to visually discern focus along a track log data structure 200 that is being presented within the display 212. When the selection device is placed in focus over a track point 202 within the display 212 presentation, the timestamp or other identifying information associated with the track point 202 in focus is visually depicted with the display 212 presentation.

In some instances, depending upon the granularity of track points 202 and/or the scale of the presentation, any particular focus caused by a user accessing the input selection device may need to be estimated to the closest available track point 202 within the track log data structure 200. Thus, an approximate track point 202 is acquired when a user accesses an input tracking device to place track points 202 in focus within the display 212 presentation.

In one embodiment, once a user has a desired focus on a track point 202, the identified track point can be graphically selected for association of processing of additional operations. In one embodiment, the operation associated with the selected track point 202 is a track back operation, which generates a route from a current position of the portable navigation device 210 to the position associated with the track point. In other embodiments, the operation with the selected track point 202 can be an operation that generates a waypoint for the selected track point 202. Moreover, the waypoint can be an entirely separate data structure from the selected track point 202 and independent of the track log data structure 200.

One of ordinary skill in the art now appreciates how track log data structures 200 associated with various embodiments of the present invention can be uniquely processed to provide additional ease of use and functionality to an end user of a portable navigation device 210. Accordingly, easier interfaces (e.g., graphical depiction and selection) with custom-configured levels of track log data structures, which have varying degrees of track point 202 density, permit users to more easily graphically view and select desired track points 202. These selected track points 202 can then be associated with track back route operations or be used to automatically generate other useful navigation data structures, such as waypoints, and the like.

Figure 3:
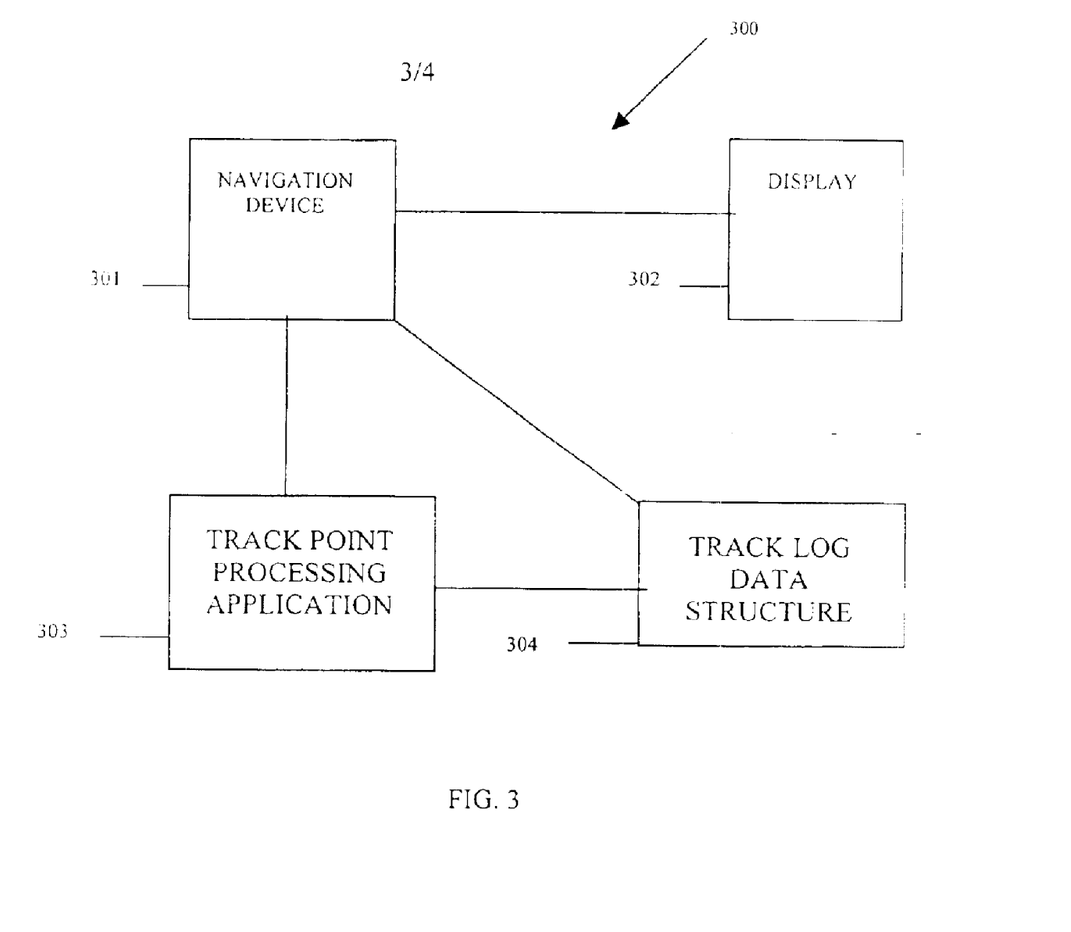
FIG. 3 is a diagram of a track log processing system, according to the teachings of the present invention.

FIG. 3 illustrates a diagram of one track log processing system 300, according to the teachings of the present invention. The track log processing system 300 includes a portable navigation or position-enabled device 301, a display or monitor 302, a track point processing application 303, and a track log data structure 304. The portable navigation device 301 is interfaced with a positioning system to acquire its geographic position. The display 302 can be in hardwired (e.g., hardwired connection or internal bus connection) to the portable navigation device 301. Alternatively, the display 302 can be wirelessly connected to the portable navigation device 301.

The track point processing application 303 is one or more software application that is operable to be processed on the portable navigation device 301. Moreover, the track point processing application 303 uses or consumes the track log data structure 304 during processing or execution.

The track log data structure 304 includes a plurality of track points that when assembled comprise a complete track log that identifies where the portable navigation device 301 has previously been (e.g., previous geographic positions). Alternatively, where desired, the track log data structure 304 may be acquired remotely from the portable navigation device 301 and represent previous geographic positions where other or different navigation devices have been. In this way, and in some embodiments of the present invention, a track log data structure 304 is portable and independent from the portable navigation device 301 that processes or executes the track point processing-application 303.

Moreover, in some embodiments, the track point processing application 303 can be remotely downloaded to the portable navigation device 301 for execution from a remote server or web site. In still further embodiments, the track point processing application 303 is processed on a processing device that is distinct from the portable navigation device 301 and is in communication with the portable navigation device 301 in order to coordinate presentation information being presented on the display 302 under the control of the portable navigation device 301.

The track point processing application 303 identifies an existing loaded track log data structure 304 being processed by one or more applications of the portable navigation device 301. Alternatively, the track point processing application acquires and loads a track log data structure 304 directly into the portable navigation device 301. Once the track log data structure 304 is loaded for processing, the track point processing application 303 can receive focus or selection commands directed from a user of the portable navigation device 301 through an input selection device (e.g., mouse, cursor, specialized keys, wands, and the like). The focus is directed to various track points associated with the track log data structure 304.

The track log data structure 304 is depicted graphically within the display 302 and overlaid onto a map that is loaded in the portable navigation device 301 and being viewed by a user. The track log data structure 304 is used to depict a bread crumb trail of a previously traversed route or path within the map.

As a user manipulates the selection device to visually scroll across a presentation on the display 302, a cursor or other scrolling symbol is placed in focus over a track point on the track log data structure 304. The track point in focus is visually depicted within the presentation for the user to consume. In one embodiment, that visual depiction is a timestamp (e.g., calendar data and time of day). The actual presentation of the timestamp within the visual fields of the display 302 is configurable. Thus, the timestamp can appear in a defined area, or can dynamically appear in a field associated with the track point where the focus is occurring.

The user accesses one or more keys or buttons associated with the input selection device in order to select a desired track point associated with the track log data structure 304. This is done graphically by the user by inspecting the presentation being dynamically presented within the display 302 and accessing commands, keys, and/or input selection devices in communication with the portable navigation device 301. The desired track point selection is communicated to the track point processing application 303, and the user accesses one or more additional menus or options via keys to assign one or more operations that are to be associated with the selected track point.

In one embodiment, a selected operation made by the user can automatically generate a waypoint that is to be associated with the selected track point under focus within the presentation of the display 302. In another embodiments, a selected operation can be a track back operation that automatically causes one or more additional navigation applications processing within the portable navigation device 301 to process in order to dynamically generate a route from a current geographic position of the portable navigation device 301 to the selected track point under focus.

Conventionally, a track log data structure 304 included only a coarse grain number of selectable track points (e.g. 10, 8, or fewer track points). These limited number of non-graphically selectable track points were all that were available for a user to select and use for purposes of attempting to generate track back routes. Moreover, these limited track points could not automatically be used to generate user-defined waypoints.

However, with embodiments of the present invention the density of track points within a track log data structure 304 that is made available for graphical user selection is significantly greater than conventional methods (e.g., 10,000 or greater) that have been provided. Moreover, with embodiments of the present invention, the user graphically views the track log data structure 304 and its corresponding track points with respect to a map being viewed by the user. Selection of desired track points can be made graphically and dynamically within a presentation of the display 302. Conventionally, track point selection is made via a table that lists a limited number of timestamps associated with track points. Thus, the interfaces of the present invention are more user-friendly and easier to control and visualize than what has been conventionally provided.

Finally, various embodiments of the present invention permit selected track points to be used in order to automatically generate waypoints or in order to associate any other desired operation that may be desirable to the user. This operation assignment and waypoint generation has not been available in the past.

Figure 4:
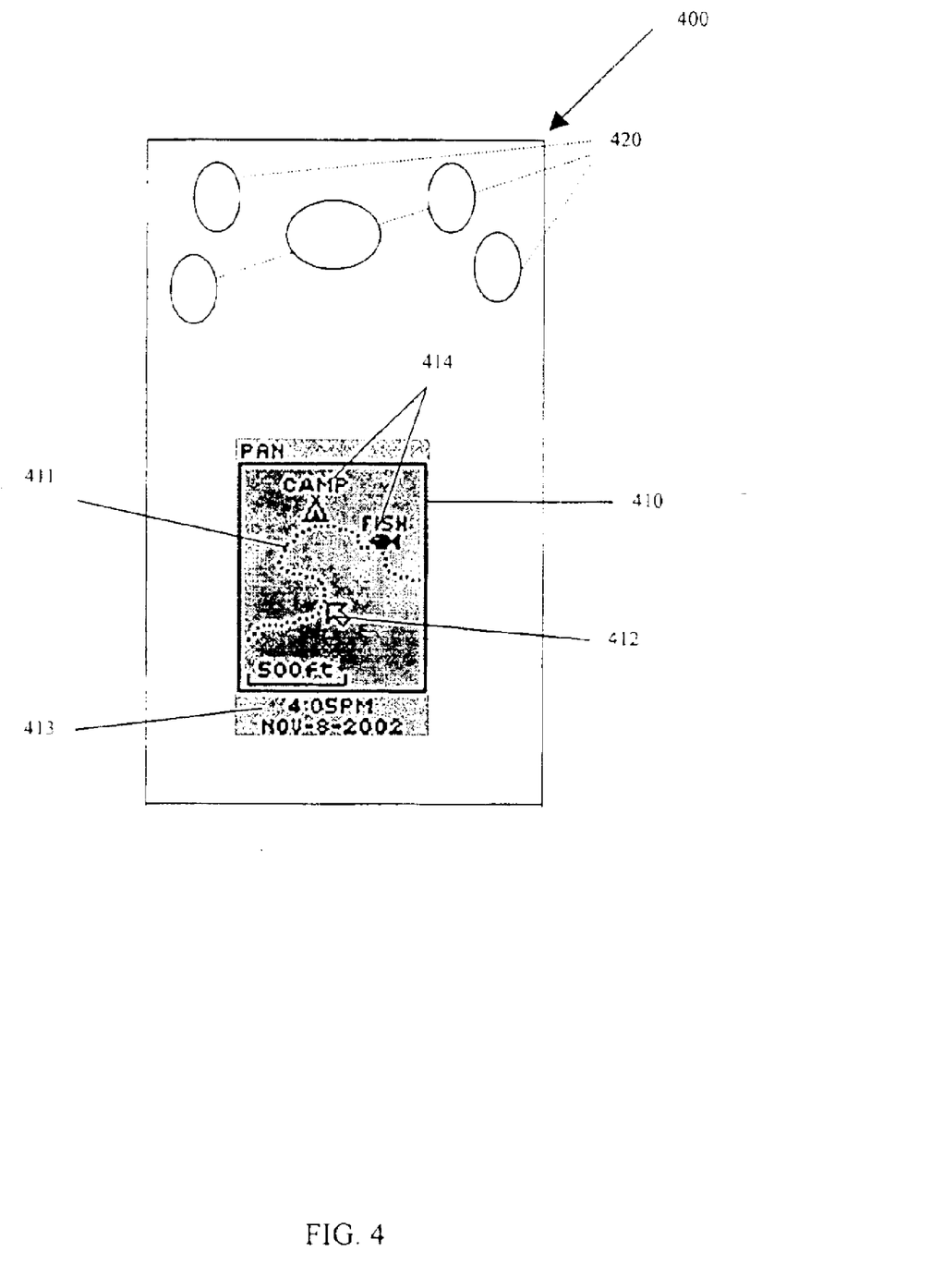
FIG. 4 is a diagram of an example portable navigation device having track log processing capabilities, according to the teachings of the present invention.

FIG. 4 illustrates a diagram of one example portable navigation device 400 having track log processing capabilities, according to the teachings of the present invention. FIG. 4 is presented for purposes of illustration only, since a variety of positioning or portable navigation devices can be used and modified to achieve the teachings of various embodiments of the present invention. All such devices with such modifications are intended to fall within the tenets of the present disclosure. In one embodiment of the present invention, portable navigation device 400 is a Geko product distributed by Garmin Ltd. of the Cayman, Islands.

The portable navigation device 400 includes a display 410 and a variety of buttons or controls 420 used for interfacing with the portable navigation device 400. The portable navigation device also includes one or more processors, memory, a power source, and receivers or transmitters for interfacing with positioning systems and/or communication systems.

Within the display 410 a particular map is depicted as a presentation. The exact presentation presented in FIG. 4 is not significant and is presented for purposes of illustration only, since a variety of different instances of maps can be presented within the display 410 by a user during any particular use of the portable navigation device 400. The sample map displayed includes two user defined waypoints 414 (e.g., camp and fish), a track log 411, and a selection cursor or arrow 412.

The user accesses one or more of the controls 420 to dynamically move the arrow 412 within the presentation of the display 410. In FIG. 4 as the arrow 412 is placed over or in a configurable proximity of the track log 411, the nearest track point (e.g., identified within the track log 411 as individual dots) is brought into focus. The unique identity of the track point under focus can be dynamically presented within the display as a timestamp 413 (e.g., "4:05 PM NOV-8-2002"). Other information regarding the track point under focus may also be available, such as a longitude and latitude coordinate, and the like.

Once a track point is under focus or affirmatively and graphically selected using one or more of the controls 420, other controls can be used to associate with or perform operations on the track point under focus. Thus, in some embodiments, a new waypoint can be generated from the track point under focus; additionally a route can be generated to track back the user of the portable navigation device 400 from a current geographical position to the track point under focus.

Visual depiction of the track log 412 within a map and visual selection using a graphical image 412 offers significant usability improvements over what has been available in the art. This interface is significantly easier to manipulate and more intuitive for end users. Additionally, the density of track points available within the track log 411 is significantly increased over prior techniques. Finally, automatic processing and assignment of operations to selected track points provide enhanced user features that were not previously available.

CONCLUSION

The above methods, data structures, and systems have been described, by way of example and not by way of limitation, with respect to improving overall interfaces and features associated with track log processing. That is, the methods, data structures, and systems provide graphical presentation of track logs and graphical selection of track points within a track log. Furthermore, operations can be automatically assigned or performed on selected track points.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices, and methods are used. The scope of the invention should be determined with reference to the appended claims, along with the full scope of equivalents to which such claims are entitled.

What is claimed is:

1. A method of processing a track log, comprising:
presenting a track log as a plurality of track points overlaid graphically on a map, wherein each track point is has a unique timestamp to distinguish it from the remaining track points;
receiving a selection for one of the track points; and
processing an operation associated with the selection.

2. The method of claim 1 wherein in presenting, the track log, the track points, and the map are displayed on a screen or a monitor in communication with a navigation device.

3. The method of claim 1 wherein in receiving, the selection is received from a graphical input selection device interfaced to a navigation device having the track log.

4. The method of claim 1 wherein in processing, the operation generates a waypoint for the selected track point.

5. The method of claim 1 wherein in processing, the operation generates a route back to the selected track point from a current position of a navigation device.

6. A track log data structure residing on a computer readable medium for processing track points, the track log data structure comprising:
a plurality of track points represented as geographic positions previously traversed by a navigation device; and
wherein the track points are graphically presented on a display in communication with a navigation device as the track log, and a selected one of the track points is graphically selected using a selection device of the navigation device and one or more operations are associated with the selected track point for immediate or subsequent processing by the navigation device, and wherein the track points include attribute information a portion of which uniquely identifies each track point and its relationship to the remaining track points.

7. The track log data structure of claim 6, wherein a total number of the plurality of track points is configurable.

8. The track log data structure of claim 6, wherein one of the one or more operations permits a route to be generated from a current position of the navigation device to the selected track point.

9. A track log processing system, comprising:
a navigation device;
a display in communication with the navigation device; and
a track point processing application operable to execute in the navigation device that identifies a plurality of track points associated with a track log data structure and permits graphical selection, from the display, of a selected track point, and wherein the selected track point is selectively associated with an operation, which is operable to be executed on the navigation device and wherein the selected track point includes attribute information acquired from the track log data structure, portions of the attribute information distinguish the selected track point from the remaining unselected track points.

10. The track log processing system of claim 9, wherein the track log data structure is acquired remotely from the navigation device.

11. The track log processing system of claim 9, wherein the track log data is acquired from a local storage or a local cache associated with the navigation device.

12. The track log processing system of claim 9, wherein the track log data structure is acquired from a removable computer readable medium interfaced to the navigation device.

13. The track log processing system of claim 9, wherein the track log data structure is presented within in the display and overlaid on a map that is also presented within the display.

14. The track log processing system of claim 9, wherein the selective operation is at least one of a track back operation and a waypoint assignment.

15. A method of processing a track log, comprising:

presenting a track log as a plurality of track points overlaid graphically on a map, wherein the track points are presented as date and time entries that each track point was recorded within the track log;

receiving a selection for one of the track points; and processing an operation associated with the selection.

16. A method of processing a track log, comprising:

presenting a track log as a plurality of track points overlaid graphically on a map;

receiving a selection for one of the track points, wherein the selection is received as a date and time entry that identifies or approximates the selected track point; and processing an operation associated with the selection.

17. A track log data structure residing on a computer readable medium for processing track points, the track log data structure comprising:

a plurality of track points represented as geographic positions previously traversed by a navigation device; and wherein the track points are graphically presented on a display in communication with a navigation device as the track log, and a selected one of the track points is graphically selected using a selection device of the navigation device and one or more operations are associated with the selected track point for immediate or subsequent processing by the navigation device, and wherein the plurality of track points are also represented as date and time entries for which each track point was previously traversed.

18. The track log data structure of claim 17, wherein when the selection device is in focus over a particular one of the plurality of track points, the particular track point in focus is graphically presented with its date and time entry overlaid on top of the track log at a location within the display that approximately represents the particular track point in focus.

19. A track log data structure residing on a computer readable medium for processing track points, the track log data structure comprising:

a plurality of track points represented as geographic positions previously traversed by a navigation device; and wherein the track points are graphically presented on a display in communication with a navigation device as the track log, and a selected one of the track points is graphically selected using a selection device of the navigation device and one or more operations are associated with the selected track point for immediate or subsequent processing by the navigation device, and wherein one of the one or more operations permit the selected track point to be associated with a waypoint.

20. The track log data structure of claim 19, wherein the waypoint is a separate and distinct data structure from the track log data structure.

21. A track log processing system, comprising:

a navigation device;

a display in communication with the navigation device; and a track point processing application operable to execute in the navigation device that identifies a plurality of track points associated with a track log data structure and permits graphical selection, from the display, of a selected track point, and wherein the selected track point is selectively associated with an operation, which is operable to be executed on the navigation device, wherein the track log data structure is presented within in the display and overlaid on a map that is also presented within the display, and wherein a number of the plurality of track points are dynamically presented within the display and overlaid on a position of the track log data structure as an input selection device is placed in focus over the position.

22. The track log processing system of claim 21, wherein the dynamically presented track points are presented as date and time entries.

* * * * *